(12) United States Patent
Loeken

(10) Patent No.: US 10,931,187 B2
(45) Date of Patent: Feb. 23, 2021

(54) VOLTAGE GENERATOR

(71) Applicant: CENTITECH GMBH, Aachen (DE)

(72) Inventor: Michael Loeken, Juelich (DE)

(73) Assignee: CENTITECH GMBH, Aachen (DE)

( * ) Notice: Subject to any disclaimer, the term of this patent is extended or adjusted under 35 U.S.C. 154(b) by 0 days.

(21) Appl. No.: 16/464,685

(22) PCT Filed: Sep. 19, 2017

(86) PCT No.: PCT/EP2017/073583
§ 371 (c)(1),
(2) Date: May 29, 2019

(87) PCT Pub. No.: WO2018/099625
PCT Pub. Date: Jun. 7, 2018

(65) Prior Publication Data
US 2019/0296628 A1  Sep. 26, 2019

(30) Foreign Application Priority Data

Dec. 1, 2016 (DE) .......................... 10 2016 123 210

(51) Int. Cl.
*H02K 35/00* (2006.01)
*H02K 35/02* (2006.01)

(52) U.S. Cl.
CPC .................................... *H02K 35/02* (2013.01)

(58) Field of Classification Search
CPC ...................................................... H02K 35/02
USPC ......................................................... 290/1 R
See application file for complete search history.

(56) References Cited

U.S. PATENT DOCUMENTS

| 2,640,173 A | * | 5/1953 | Cavanagh | H03F 1/08 |
| | | | | 315/370 |
| 3,793,532 A | * | 2/1974 | Wiegand | G06K 7/083 |
| | | | | 307/421 |
| 4,335,700 A | * | 6/1982 | Hauler | F02P 7/0672 |
| | | | | 123/617 |

(Continued)

FOREIGN PATENT DOCUMENTS

| CN | 1647351 B | 6/2011 |
| CN | 104038023 A | 9/2014 |

(Continued)

*Primary Examiner* — Julio C. Gonzalez
(74) *Attorney, Agent, or Firm* — Norman B. Thot

(57) ABSTRACT

A voltage generator for converting a movable magnetic field into electrical voltage. The voltage generator includes an excitation unit, a conversion unit, and a power line unit. The excitation unit includes at least one magnet which is arranged on a body which is rotatably and/or moveably mounted. The at least one magnet generates a magnetic field. The conversion unit functionally cooperates with the excitation unit. The conversion unit includes a support body and a magnetization wire which is magnetized by the magnetic field. The magnetization wire includes, over its cross-section, a magnetically hard part and a magnetically soft part. The magnetization wire is wound around the support body to provide an axial tension. The power line unit functionally cooperates with the conversion unit. The power line unit includes an electric coil which is arranged around the conversion unit. The electric coil includes an electrifiable current conductor wire.

13 Claims, 3 Drawing Sheets

(56) References Cited

U.S. PATENT DOCUMENTS

| | | | | |
|---|---|---|---|---|
| 4,772,813 A * | 9/1988 | Mohri | ............... | H02K 39/00 |
| | | | | 310/26 |
| 6,120,617 A * | 9/2000 | Hausch | ............... | C21D 8/12 |
| | | | | 148/121 |
| 6,140,727 A * | 10/2000 | Goto | ............... | G01P 3/488 |
| | | | | 310/155 |
| 6,160,322 A * | 12/2000 | Gotoh | ............... | G01D 5/2013 |
| | | | | 307/106 |
| 6,384,595 B1 * | 5/2002 | Ito | ............... | G01D 5/145 |
| | | | | 324/174 |
| 9,281,729 B2 * | 3/2016 | Yoshidomi | ............ | G01D 5/145 |
| 9,350,216 B2 * | 5/2016 | Labriola, II | ......... | G01D 5/2451 |
| 2003/0155771 A1 * | 8/2003 | Cheung | ............ | H02K 35/02 |
| | | | | 290/1 R |
| 2007/0272293 A1 | 11/2007 | Schmidt | | |
| 2015/0061419 A1 | 3/2015 | Li | | |
| 2019/0319524 A1 * | 10/2019 | Ueno | ............... | H02K 35/02 |

FOREIGN PATENT DOCUMENTS

| | | |
|---|---|---|
| DE | 29 33 337 A1 | 3/1981 |
| DE | 30 06 585 A1 | 9/1981 |
| DE | 42 02 240 A1 | 7/1993 |
| DE | 199 25 884 C2 | 12/2000 |
| DE | 10 2006 024 167 A1 | 11/2007 |
| DE | 10 2012 017 071 A1 | 10/2013 |
| DE | 20 2015 103 893 U1 | 11/2015 |
| JP | 2011-125470 A | 6/2011 |

* cited by examiner

VOLTAGE GENERATOR

CROSS REFERENCE TO PRIOR APPLICATIONS

This application is a U.S. National Phase application under 35 U.S.C. § 371 of International Application No. PCT/EP2017/073583, filed on Sep. 19, 2017 and which claims benefit to German Patent Application No. 10 2016 123 210.6, filed on Dec. 1, 2016. The International Application was published in German on Jun. 7, 2018 as WO 2018/099625 A1 under PCT Article 21(2).

FIELD

The present invention relates to a voltage generator for converting a moving magnetic field into electrical voltage. The voltage generator comprises an excitation unit which comprises at least one magnet, in particular a permanent magnet, which is arranged on a rotatably and/or moveably mounted body such as, for example, a shaft, and is provided for generating a magnetic field. The magnetic field herein follows the movement of the body. A conversion unit, functionally cooperating with the excitation unit, comprises a magnetization wire adapted to be magnetized by the magnetic field. The magnetization of the magnetization wire herein can be changed by one of the moveable magnets and by the magnetic field, respectively, in that, at least in a magnetic field detection range, a magnetic flux direction in the magnetization wire is changeable by the magnetic field. There is also provided a power line unit which functionally cooperates with the conversion unit and which comprises an electric coil arranged around the conversion unit, in particular around the magnetization wire, the electric coil having an electrifiable current conductor wire. An electric voltage can be induced in the current conductor wire via the change of the magnetic flux direction of the magnetization wire.

BACKGROUND

Voltage generators of the above type can in particular be used to generate electrical energy from a mechanical movement without the necessity of mechanical parts which are subject to wear, and/or of wear-prone chemical energy stores such as, for example, batteries. This makes it possible, for example, to supply power to electronic circuits by use of commercially available component parts. In such an arrangement, the generation of energy is nearly independent from the speed of the mechanical movement.

Such a voltage generator can be used with particular advantage in particular in rotational angle measurement devices for detection of a movement, particularly a rotational movement of a shaft. In this arrangement, the permanent magnet is in most cases arranged on a shaft end, and the magnetization wire is arranged together with the current conductor wire at an axial distance from the magnet. A detection device of this type is described, for example, in DE 20 2015 103 893 U1 where, by reversal of poles or changing the magnetization of a pulse wire, a relatively low voltage is induced in an induction wire arranged around the pulse wire. The generated voltage is so low that it can only be used for a short-time forwarding and subsequent evaluation of a measuring signal for position detection of a shaft.

SUMMARY

An aspect of the present invention is to provide a voltage generator which makes it possible to obtain a particularly efficient voltage induction in the current conductor wire and, thereby, an induced voltage that is relatively large and which can be used for further purposes.

In an embodiment, the present invention provides a voltage generator for converting a movable magnetic field into electrical voltage. The voltage generator includes an excitation unit, a conversion unit, and a power line unit. The excitation unit comprises at least one magnet which is arranged on a body which is configured to be at least one of rotatably mounted and moveably mounted. The at least one magnet is configured to generate a magnetic field. The conversion unit is configured to functionally cooperate with the excitation unit. The conversion unit comprises a support body and a magnetization wire which is configured to be magnetized by the magnetic field. The magnetization wire comprises, over its cross-section, a magnetically hard part and a magnetically soft part. The magnetization wire is wound around the support body so as to provide an axial tension. The power line unit is configured to functionally cooperate with the conversion unit. The power line unit comprises an electric coil which is arranged around the conversion unit. The electric coil comprises an electrifiable current conductor wire.

BRIEF DESCRIPTION OF THE DRAWINGS

The present invention is described in greater detail below on the basis of embodiments and of the drawings in which.

DETAILED DESCRIPTION

Figure 1:
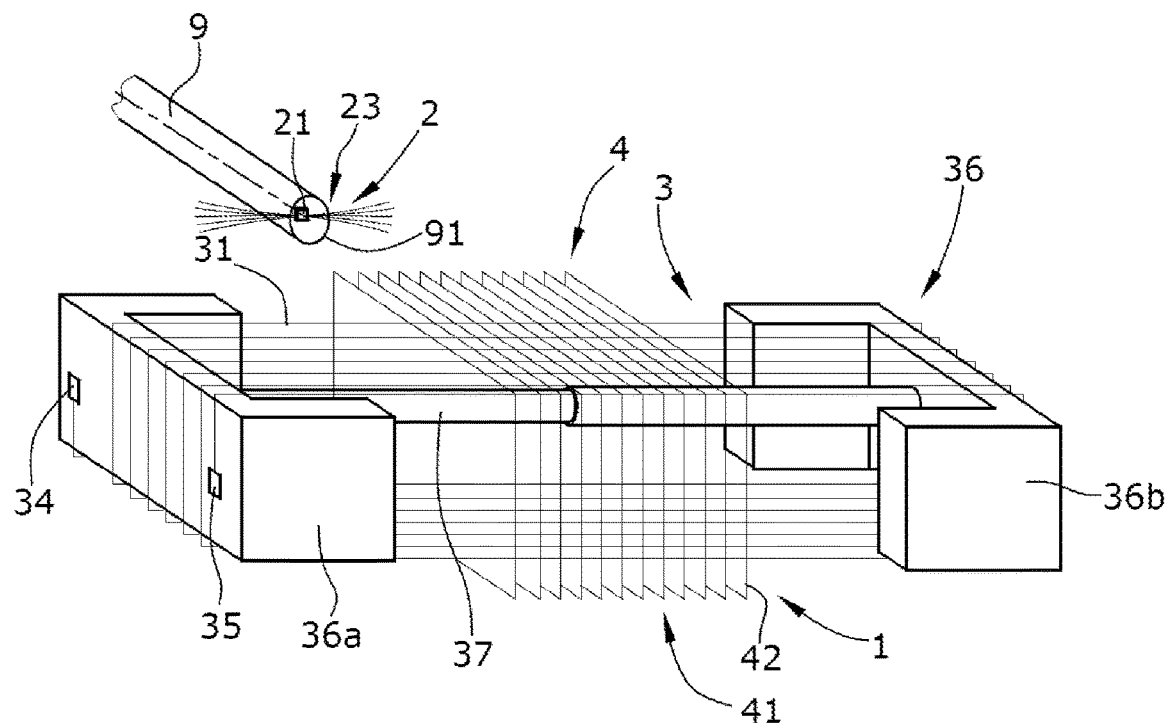
FIG. 1 shows an embodiment of a voltage generator according to the present invention in a perspective view.

According to the present invention, the magnetization wire, as viewed across its cross section, comprises a magnetically hard part, for example, a wire core, and a magnetically soft part, for example, a wire sheath. A magnetically hard part is defined as being a material region having a relatively high magnetic coercive field strength, and a magnetically soft part is defined as being a material region having a relatively low magnetic coercive field strength. This circumstance can be used, for example, to effect different degrees of magnetization so as to generate Barkhausen jumps. The magnetization wire is wound around a support body and comprises an axial tensile stress. This mechanical tensile stress can be generated when winding the wire around a support body and/or by other suitable means temporally after the winding. As a result of the biomorphic arrangement of the magnetically hard part and the magnetically soft part, the two parts can have a different respective magnetic flux direction. Each of these parts can in particular have its own polarity along the wire axis. When a critical external magnetic field strength is exceeded, the biomorphic configuration of the magnetization wire can thereby lead to a rapid change of magnetization of the wire parts in the form of a large Barkhausen jump. In this situation, the flux directions in the two parts of the magnetization wire do not need to be oriented identically but can also be mutually opposite. It is indeed possible and advantageous that the orientations of the magnetic flux directions of the two parts are in a mutual dependence and that, particularly if the magnetic flux direction in one of the two parts is changed, the magnetic flux direction of the other part is changed into the same direction. This relatively large magnetic impulse and/or pulse in the magnetization wire, as effected by the change of magnetization, will then cause the induction of a voltage in the current conductor wire arranged as a coil around the magnetization wire. To further increase the magnetic pulse in the magnetization wire, the present invention provides that the magnetization wire is wound around a support body with generation of a mechanical tensile stress. Winding the magnetization wire around the support body has the result that a plurality of magnetically effective magnetization wire portions and/or segments are arranged in parallel in a "wire bundle". A superposition of the individual pulses evoked in the individual magnetization wires by the moved magnetic field can thereby take place, resulting in the triggering of a relatively large total magnetic pulse. The generation of a mechanical tensile stress in the magnetization wire also makes it possible to achieve a particularly fast and pulse-like change of magnetization in the longitudinal extension of the magnetization wire so that, due to a change of magnetization that is relatively slow and is variable in its speed, there is generated an abrupt change of magnetization and, as a consequence of this abrupt change of magnetization across the entire surface, relatively large pulse energy is released which, according to the laws of magnetic induction, can then generate a particularly large voltage in the current conductor wire. The thus generated voltage can be used, depending on the respective design size of the voltage generator, for a self-contained operation of an entire device. The voltage can in particular be used to detect a movement and/or for voltage supply of electronic circuits. The voltage generator of the present invention therefore allows for a wear-free conversion of kinetic energy into electric energy by use of a relatively simple technical arrangement.

In an embodiment of the present invention, the magnetization wire can, for example, be configured so that the magnetically hard part and the magnetically soft part have different respective magnetizations. This makes it possible to in particular effect an abrupt "fold-over" of the magnetic flux direction in one of the two parts, whereby a relatively large pulse can be generated and a relatively large voltage can be induced in the current conductor wire.

In an embodiment of the present invention, the magnetization wire can, for example, be configured so that a change of an external magnetic field will cause an abrupt change of the magnetization of the magnetically hard part and/or an abrupt change of the magnetization of the magnetically soft part along the wire axis. A suitable external magnetic field that is changing can in particular first trigger a change of magnetization of the magnetically soft part and, then, additionally, a change of magnetization of the magnetically hard part in the direction of the external magnetic field. A relatively large magnetic pulse can thereby be generated in the magnetization wire, which will cause a relatively large voltage in the current conductor wire. It can alternatively be provided that, in the case of a change of the magnetic flux direction of one part of the wire, the magnetic flux direction of the other part is also "pulled along", i.e., the magnetic flux directions of both parts can be directly changed, in a successive manner, into one direction.

In an embodiment of the present invention, the magnetization wire can, for example, be twisted along its longitudinal extension. A particularly fast and effective change of magnetization can thereby be obtained in the magnetization wire in the longitudinal extension of the magnetization wire so that, as a consequence of this abrupt change of magnetization across the entire surface, a particularly large voltage can be induced in the current conductor wire.

In an embodiment of the present invention, the winding direction of the magnetization wire can, for example, be oriented vertically to the winding direction of the current conductor wire. The induction in the current conductor wire which is wound as a coil around the magnetization wire can thereby be restricted to a portion of the current conductor wire and, thus, the generation of voltage in the current conductor wire can be increased.

In an embodiment of the present invention, the magnetization wire can, for example, comprise two axial wire ends via which the magnetization wire is fastened to the support body. It can in particular be provided that exclusively one magnetization wire is wound a plurality of times around the support body. By the attachment of both ends of the magnetization wire to the support body, the mechanical tensile stress acting on the magnetization wire can be maintained durably and in a relatively simple manner.

In an embodiment of the present invention, the magnetization wire can, for example, comprise two axial wire ends which are connected to each other via a material bonding, by a force locking and/or by a form locking. This allows for a permanent fixation of the wire to the support body and for a relatively inexpensive production of the conversion unit.

In an embodiment of the present invention, the support body can, for example, be plate-shaped and the magnetization wire can, for example, be wound around the support body in the longitudinal extension of the support body. As a result, the magnetization wire can be wound around the support body over a relatively wide surface so that the magnetization wires, arranged nearly parallel, form a relatively wide surface. The magnetization wire and/or a substantially areal wire portion of the magnetization wire facing toward the excitation unit can thus be influenced by the moving magnetic field in a particularly effective manner. A change of the magnetic flux direction in the magnetization wire can in particular take place across the entire surface, facing toward the excitation unit, of the magnetization wire wound around the plate-shaped support body, thus allowing for a relatively large total magnetic pulse to be generated which will effect a relatively large voltage in the current conductor wire.

In an embodiment of the present invention, the support body can, for example, be adjustable in length in the longitudinal extension. The length of the support body can thereby be produced individually for each application, i.e., for each required length of the support body and/or size of the electric coil, and in a particularly inexpensive manner.

In an embodiment of the present invention, the support body can, for example, be configured so that its longitudinal extension is adjustable in length and/or that its longitudinal extension can increase and/or decrease also after the magnetization wire has been wound around the support body. The mechanical tensile force acting on the magnetization wire can thereby still be individually adjusted also after the magnetization wire has been wound around the support body. The cooperation between the excitation unit and the conversion unit can consequently be fine-tuned individually and also after the individual components have been mounted, thus making it possible to achieve an optimum efficiency of this cooperation, particularly the triggering of a change of magnetization.

In an embodiment of the present invention, the support body can, for example, comprise a first support body part and a second support body part, wherein, between the first support body part and the second support body part, a biasing member is arranged for biasing the two support body parts away from each other. The support body can thereby be changed in position in a particularly simple manner. Due to the biasing force between the two support body parts, the support body can also enhance the mechanical tensile stress acting on the magnetization wire in a particularly simple manner.

The biasing member can generally be configured in any desired manner, for example, in the form of a tube connection to be established by mutual insertion or threading. The biasing member can, for example, be formed as an elastic spring. A biasing stress can thereby be permanently maintained and a naturally occurring change of length of the support body and the magnetization wire, as caused, for example, by a varying ambient temperature, can be automatically compensated so that the mechanical tensile stress acting on the magnetization wire can be kept constant on a permanent basis.

In an embodiment of the present invention, the width of the electric coil can, for example, substantially correspond to the length of the support body. Use can thus be made of the maximal possible width of the coil for inducing a voltage so that the induction effect in the current conductor wire is particularly effective and the voltage generator is particularly favorable.

In an embodiment of the present invention, the current conductor wire can, for example, be connected to a store for storage of electrical energy. The induced voltage can thereby first be stored on a temporary basis and then be retrieved again at a later point of time.

The present invention will be explained in greater detail hereunder by way of two embodiments under reference to the accompanying drawings.

Figure 2:
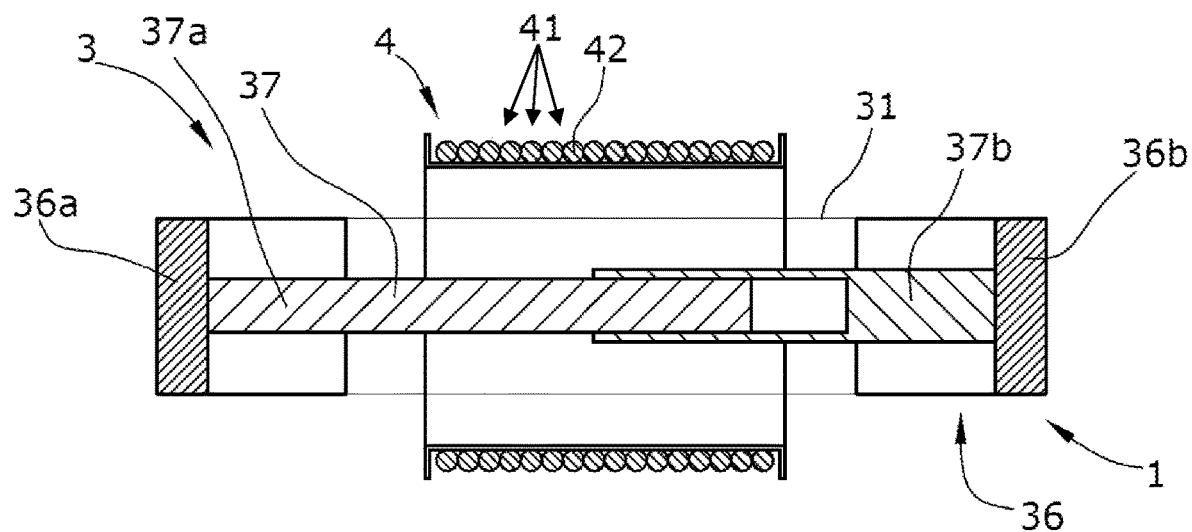
FIG. 2 shows the voltage generator of FIG. 1 in a lateral sectional view.

Each of FIGS. 1 and 2 show an embodiment of a voltage generator 1 for converting a movable magnetic field 23 into an electrical voltage. For this purpose, the voltage generator 1 comprises an excitation unit 2 arranged on a movable body 9, a stationary conversion unit 3 functionally cooperating with the excitation unit 2, and a power line unit 4 functionally cooperating with the conversion unit 3.

The excitation unit 2 is herein arranged on a shaft 9, for example, a drive shaft of a motor (which is not illustrated in the drawings). The excitation unit 2 comprises at least a magnet 21 for generating a magnetic field 23. The magnet 21 comprises a north pole and a south pole and is arranged, particularly centrically, on an end side wall 91 of shaft 9. It is of course also possible that more than one magnet 21 be arranged on shaft 9. As a result of the arrangement of the magnet 21 on the end side wall 91, a magnetic field 23 is generated in this region which, when the shaft 9 is rotated, will follow the movement of the shaft 9. The conversion unit 3 is arranged at a small axial distance to the end side wall 91 and/or to the magnet 21.

The conversion unit 3 is stationary and comprises a support body 36 with a magnetization wire 31 wound around it that is magnetizable by the magnetic field 23. Thereby, upon rotation of the shaft 9 and/or the magnet 21 and/or the magnetic field 23, a magnetic flux direction in the magnetization wire 31 can be changed.

Figure 4:
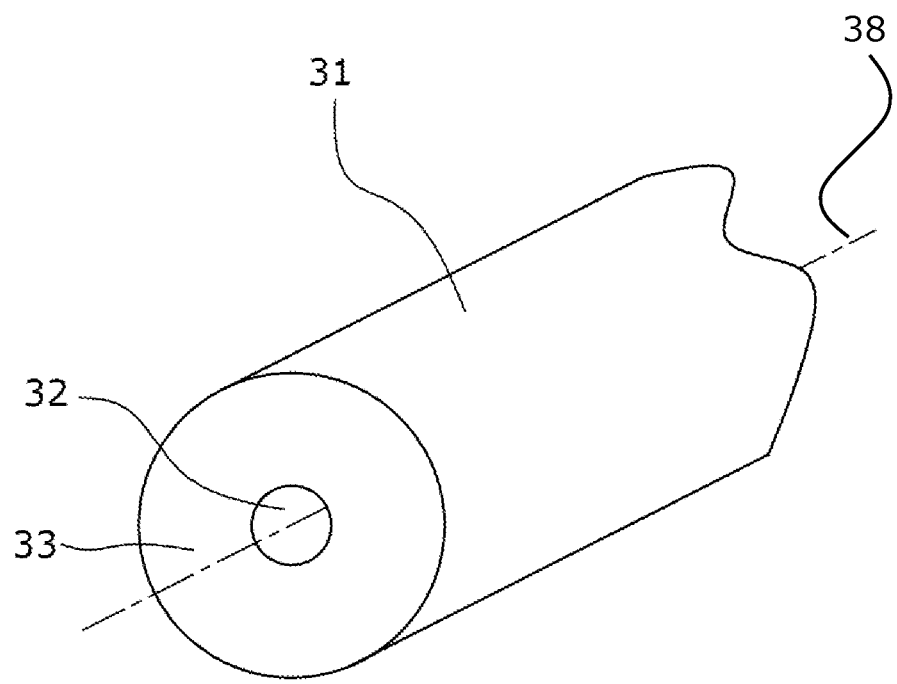
FIG. 4 shows an embodiment of the magnetization wire.
Figure 5:
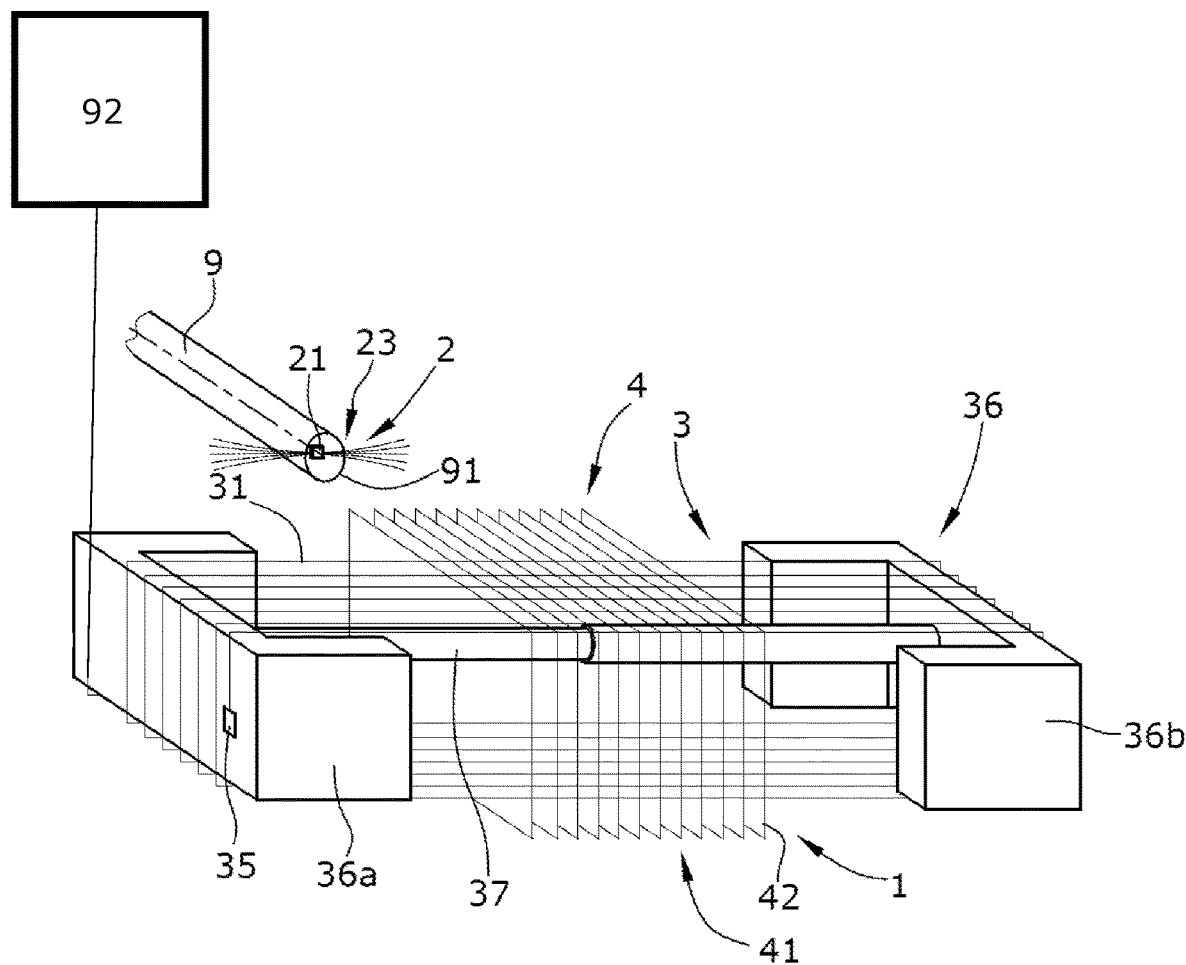
FIG. 5 shows an embodiment of a voltage generator according to the present invention in a perspective view where the current conductor wire is connected to a storage device for the storage of electrical energy.

The magnetization wire 31 herein comprises a magnetically hard metal core 32 and a magnetically soft metal sleeve 33, as shown in greater detail in FIG. 4. The magnetically hard metal core 32 can herein have a different magnetic flux direction than the magnetically soft metal sleeve 33. A reversal of the magnetic flux direction is possible in the magnetization wire 31 via the magnetic field 23 generated by the magnet 21. Such a reversal of the magnetic flux direction will in particular occur as soon as, due to the rotation of shaft 9, the magnetic field 23 travels past the magnetization wire 31 with the north and the south pole. It can also be provided that the magnetic flux direction is first changed in the outer magnetically soft metal sleeve 33 and, subsequently thereto, also in the magnetically hard metal core 32. This process is of course also possible in the reverse order. There is thus effected a change of the magnetic flux direction in the magnetization wire 31 that is also referred to as a "Barkhausen effect (jump)". In order to intensify this effect, it is provided that the magnetization wire 31 is arranged in a twisted configuration along its longitudinal extension and comprises a magnetic tensile stress. For this purpose, the present invention provides that the magnetization wire 31 is fastened by its two axial wire ends 34, 35 to the support body 36 and is wound around the support body 36, in particular a plurality of times, with formation of a mechanical tensile stress.

The support body 36 can generally be designed as a conventional coil carrier, in particular formed as one part and shaped as a plate, which has the magnetization wire 31 wound around it, for example, in the longitudinal extension of the support body 36. In the embodiment of the support body 36 shown in the drawings, the support body is not formed as one part, but comprises two support body parts, namely a first support body part 36a and a second support body part 36b. Between the first support body part 36a and the second support body part 36b, a biasing member 37 is arranged which connects the two support body parts 36a, 36b to each other. The biasing member 37 can generally be formed in different variants.

In an embodiment of the voltage generator 1 as shown in FIGS. 1 and 2, the biasing member 37 is configured as a rod assembly formed by two rods 37a, 37b, wherein the two rods 37a, 37b can be connected by a threaded engagement. By threading the two rods 37a, 37b relative to each other, the first support body 36a can be changed in its length and, respectively, a biasing force can be generated to act on the two support body parts 36a, 36b, for example, for biasing the magnetization wire 31. This allows for a subsequent application of tensile stress onto a magnetization wire 31 which has, for example, already been wound onto a support body 36 without tensile stress.

Figure 3:
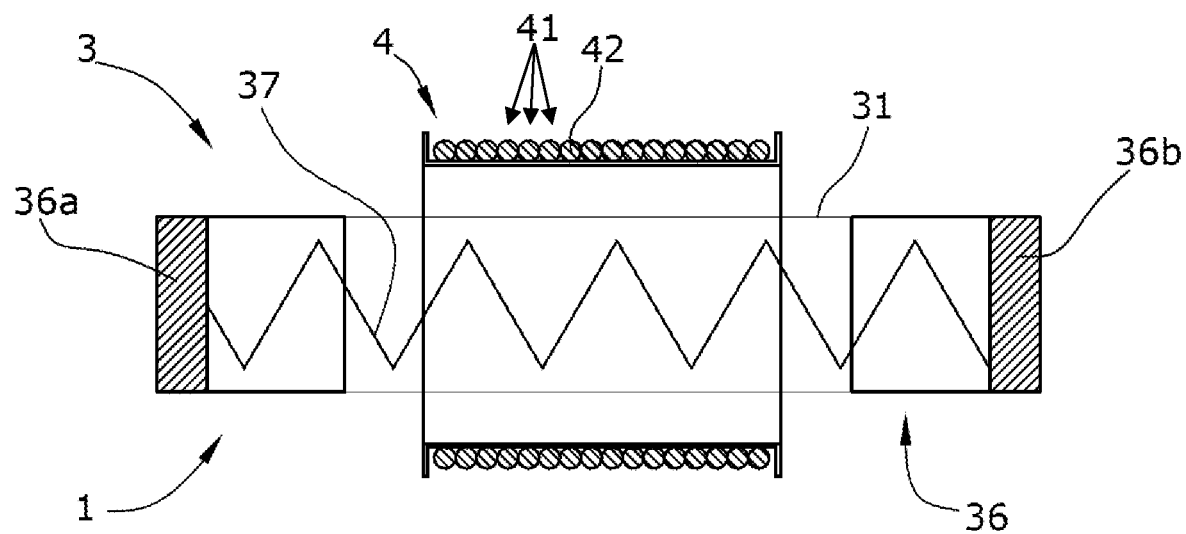
FIG. 3 shows an embodiment of a voltage generator according to the present invention in a lateral sectional view.

In an embodiment of the voltage generator 1 as shown in FIG. 3, the biasing member 37 for generating a biasing force between the first support body part 36a and the second support body part 36b is formed as an elastic spring. The bias of the two support body parts 36a, 36b against each other can thereby be automatically compensated in case of a change of length occurring on the support body 36, as caused, for example, by a varying ambient temperature. The mechanical tensile stress acting on the magnetization wire 31 can thereby be permanently kept constant, and a particularly effective pulse generation can be achieved in the magnetization wire 31 so that a relatively large voltage can be induced in the power line unit 4.

For this purpose, the power line unit 4 comprises an electric coil 41 arranged vertically to the longitudinal extension of the conversion unit 3 and around the conversion unit 3 and including an electrifiable current conductor wire 42. The winding direction of the current conductor wire 42 is in particular oriented vertically to the winding direction of the magnetization wire 31. Upon a change of the magnetic flux direction, a relatively large voltage can thereby be generated in the current conductor wire 42. For conveyance and storage of the induced voltage, the current conductor wire 42 can be connected to a device, in particular to a storage device 92 for storage of electrical energy.

It should be understood that the present invention is not limited to the above described exemplary embodiments. An adaptation of the magnets, the biasing member and/or the electric coil can, for example, be performed by a person skilled in the art. A larger or smaller number of magnets can also be arranged on the movable body. Reference should also be had to the appended claims.

LIST OF REFERENCE NUMERALS

- 1 voltage generator
- 2 excitation unit
- 21 magnet
- 23 magnetic field
- 3 conversion unit
- 31 magnetization wire
- 32 magnetically hard metal core
- 33 magnetically soft metal sleeve
- 34 wire end
- 35 wire end
- 36 support body
- 36a first support body part
- 36b second support body part
- 37 biasing member
- 37a rod
- 37b rod
- 38 wire axis
- 4 power line unit
- 41 electric coil
- 42 current conductor wire
- 9 movable body/shaft
- 91 end side wall
- 93 Storage device

What is claimed is:

1. A voltage generator for converting a movable magnetic field into electrical voltage, the voltage generator comprising:
    an excitation unit comprising at least one magnet which is arranged on a body which is configured to be at least one of rotatably mounted and moveably mounted, the at least one magnet being configured to generate a magnetic field;
    a conversion unit configured to functionally cooperate with the excitation unit, the conversion unit comprising a support body and a magnetization wire which is configured to be magnetized by the magnetic field, the magnetization wire comprising, over a cross-section of the magnetization wire, a magnetically hard part and a magnetically soft part, the magnetization wire being wound around the support body so as to provide an axial tension; and
    a power line unit configured to functionally cooperate with the conversion unit, the power line unit comprising an electric coil which is arranged around the conversion unit, the electric coil comprising an electrifiable current conductor wire,
    wherein,
    the support body is arranged to have a plate-shape,
    the support body comprises a longitudinal extension, and
    the magnetization wire is wound in a direction of the longitudinal extension around the support body.

2. The voltage generator as recited in claim 1, wherein the magnetization wire is further configured so that the magnetically hard part and the magnetically soft part can each comprise a magnetization which is different.

3. The voltage generator as recited in 1, wherein the magnetization wire is further configured so that a change of an external magnetic field will cause at least one of an abrupt change of the magnetization of the magnetically hard part and an abrupt change of the magnetization of the magnetically soft part along an axis of the magnetization wire.

4. The voltage generator as recited in claim 1, wherein, the magnetization wire further comprises a longitudinal extension, and
    the magnetization wire is arranged to be twisted along the longitudinal extension.

5. The voltage generator as recited in claim 1, wherein, the magnetization wire further comprises a winding direction,
    the electrifiable current conductor wire comprises a winding direction, and
    the winding direction of the magnetization wire is oriented vertically to the winding direction of the electrifiable current conductor wire.

6. The voltage generator as recited in claim 1, wherein the magnetization wire further comprises two axial wire ends via which the magnetization wire is fastened to the support body.

7. The voltage generator as recited in claim 1, wherein the magnetization wire further comprises two axial wire ends which are connected to each other via at least one of a material bonding, a force locking, and a form locking.

8. The voltage generator as recited in claim 1, wherein a length of the support body is configured to be adjustable along the longitudinal extension.

9. The voltage generator as recited in claim 8, wherein the support body is configured so that the length of the support body along the longitudinal extension remains adjustable even after the magnetization wire has been wound around the support body.

10. The voltage generator as recited in claim 1, wherein the support body comprises a first support body part, a second support body part, and a biasing member which is arranged between the first support body part and the second support body part, the biasing member being configured to bias the first support body part and the second support body part away from each other along the longitudinal extension of the support body.

11. The voltage generator as recited in claim 10, wherein the biasing member is formed as an elastic spring.

12. The voltage generator as recited in claim 1, wherein a width of the electric coil substantially corresponds to a length of the support body.

13. The voltage generator as recited in claim 1, wherein the electrifiable current conductor wire is connected to a store for a storage of electrical energy.

* * * * *